(12) United States Patent
Lessmann et al.

(10) Patent No.: US 10,735,315 B2
(45) Date of Patent: Aug. 4, 2020

(54) METHOD OF FORWARDING PACKET FLOWS IN A NETWORK AND NETWORK SYSTEM

(71) Applicant: NEC Laboratories Europe GmbH, Heidelberg (DE)

(72) Inventors: Johannes Lessmann, Gummersbach (DE); Roberto Bifulco, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 25 days.

(21) Appl. No.: 16/088,826

(22) PCT Filed: Mar. 30, 2016

(86) PCT No.: PCT/EP2016/056929
§ 371 (c)(1),
(2) Date: Sep. 27, 2018

(87) PCT Pub. No.: WO2017/167359
PCT Pub. Date: Oct. 5, 2017

(65) Prior Publication Data
US 2019/0297007 A1    Sep. 26, 2019

(51) Int. Cl.
*H04L 12/721* (2013.01)
*H04L 12/715* (2013.01)
*H04W 84/18* (2009.01)

(52) U.S. Cl.
CPC .............. *H04L 45/38* (2013.01); *H04L 45/64* (2013.01); *H04W 84/18* (2013.01)

(58) Field of Classification Search
CPC ......... H04L 45/64; H04L 45/38; H04W 84/18
See application file for complete search history.

(56) References Cited

U.S. PATENT DOCUMENTS

| 2016/0182363 A1* | 6/2016 | Li ........................... H04L 45/22 709/223 |
| 2016/0197845 A1* | 7/2016 | Puttaswamy Naga ........................ H04L 45/42 709/225 |

(Continued)

OTHER PUBLICATIONS

Laura Galluccio, et al., "SDN-WISE: Design, prototyping and experimentation of a stateful SDN solution for Wireless Sensor networks", 2015 IEEE Conference on Computer Communications (INFOCOM), Aug. 2015, pp. 513-521.

(Continued)

*Primary Examiner* — Brian D Nguyen
(74) *Attorney, Agent, or Firm* — Leydig, Voit & Mayer, Ltd.

(57) ABSTRACT

A method of forwarding packet flows in a network includes originating the packet flows from a plurality of end hosts in the network; and transmitting the packet flows from a respective end host of the plurality of end hosts to a sink node via a predefined routing path that includes one or more SDN switches that are under control of an SDN controller. The one or more SDN switches include an edge switch having at least one port connected to the end host. Forwarding of a packet flow from the respective end host by the edge switch is enabled by a dedicated door-opener packet that, when being processed at the one or more SDN switches, effectuates activation or installation of a forwarding rule within the one or more SDN switches for forwarding the packet flow to a next switch along the predefined routing path.

20 Claims, 4 Drawing Sheets

(56) References Cited

U.S. PATENT DOCUMENTS

| | | | | |
|---|---|---|---|---|
| 2016/0234234 | A1* | 8/2016 | McGrew | H04L 63/1425 |
| 2016/0241436 | A1* | 8/2016 | Fourie | H04L 47/2425 |
| 2017/0026263 | A1* | 1/2017 | Gell | G06F 16/1844 |
| 2017/0093722 | A1* | 3/2017 | Gonzalez Castano | H04L 47/125 |
| 2017/0245310 | A1* | 8/2017 | Chandramouli | H04W 8/20 |
| 2017/0250869 | A1* | 8/2017 | Voellmy | H04L 41/0893 |
| 2018/0091557 | A1* | 3/2018 | Komu | H04L 63/0218 |

OTHER PUBLICATIONS

Giuseppe Bianchi, et al., "OpenState: Programming Platform-independent Stateful OpenFlow Applications Inside the Switch", ACM SIGCOMM Computer Communication Review, vol. 44, issue 2, Apr. 2014, pp. 44-51.

Laura Galluccio, et al., "SDN-WISE: Design, prototyping and experimentation of a stateful SDN solution for Wireless SEnsor networks", 2015 IEEE conference on computer communications (infocom), Apr. 1, 2015 (Apr. 1, 2015), pp. 513-521, XP055320332.

Giuseppe Bianchi, et al., "OpenState: Programming Platform-independent Stateful OpenFlow Applications Inside the Switch", ACM SIGCOMM Computer Communication Review, Apr. 1, 2014 (Apr. 1, 2014), XP055319944.

Roberto Bifulco, et al., "Towards Scalable SDN Switches: Enable Faster Flow Table Entries Installation", Proceedings of the 2015 ACM Conference on Special Interest Group on Data Communication (SIGCOMM '15), Dec. 2015, pp. 343-344, New York USA.

Naga Katta, et al. "Infinite CacheFlow in software-defined networks", Proceedings of the third workshop on Hot topics in software defined networking (HotSDN '14), Dec. 2014, pp. 175-180, New York USA.

M. Dusi, et al., "Reactive logic in software-defined networking: Measuring flow-table requirements", Wireless Communications and Mobile Computing Conference (IWCMC), Aug. 4-8, 2014, pp. 340-345.

* cited by examiner

METHOD OF FORWARDING PACKET FLOWS IN A NETWORK AND NETWORK SYSTEM

CROSS REFERENCE TO RELATED APPLICATIONS

This application is a U.S. National Stage Application under 35 U.S.C. § 371 of International Application No. PCT/EP2016/056929 filed on Mar. 30, 2016. The International Application was published in English on Oct. 5, 2017, as WO 2017/167359 A1 under PCT Article 21(2).

FIELD

The present invention generally relates to a method of forwarding packet flows in a network. Furthermore, the present invention relates to a corresponding network system.

BACKGROUND

Technical fields of application for embodiments of the present invention are, for instance, so called "Smart Cities" and comparable scenarios, where a huge number of sensors, e.g. smart meters, is connected to a network infrastructure. Many of these sensors may send data only very infrequently, e.g. once per hour or even once per day, to some sink such as an IoT (Internet of Things) database or server. Sensors either proactively push this data to the centralized IoT server or the latter polls the sensor—either in fixed intervals or on demand.

If permanent flow rules were to be installed for every sensor in the network, this would quickly overload the flow tables of the network's switches, especially those located closer to the IoT servers. While for the uplink direction (i.e. from the sensors to the servers), aggregate forwarding based on destination IP address would alleviate much of this problem, the issue cannot be avoided in the downlink direction which requires more granular flow rules.

Now it is certainly possible to use reactive flow rule installation in the flow-based programmable network devices (e.g. SDN switches) of the network infrastructure that carry data packets from the sensors to the IoT servers or to any other sink. With this, a sensor (or its IoT gateway) would send its data packet to the ingress switch, which—assuming an SDN network and in the absence of any matching rule—would consult an SDN controller and thus get a flow rule on demand. This rule could have an associated timeout value, so would disappear after a while. This method alleviates the flow rule overload problem as it distributes flow rule entries over time (provided sensors do not send all at the same time, which seems like a reasonable assumption in a heterogeneous system such as a Smart City network). However, it comes at the expense of high signaling load between switches and SDN controller. Millions of sensors will generate millions of message exchanges along the forwarding path in regular intervals. This may be considered a problem in itself.

An alternative solution would be the implementation of flow tables "expansions" (as described, for instance, in Roberto Bifulco and Anton Matsiuk: "Towards Scalable SDN Switches: Enabling Faster Flow Table Entries Installation", in *Proceedings of the* 2015 *ACM Conference on Special Interest Group on Data Communication* (SIG-COMM '15). ACM, New York, N.Y., USA, 343-344, DOI=http://dx.doi.org/10.1145/2785956.2790008, or in Naga Katta, Omid Alipourfard, Jennifer Rexford, and David Walker: "Infinite CacheFlow in software-defined networks", in *Proceedings of the third workshop on Hot topics in software defined networking* (HotSDN '14). ACM, New York, N.Y., USA, 175-180, DOI=http://dx.doi.org/10.1145/2620728.2620734). For example, one could use the switch's CPU to implement software flow tables, which can hold large numbers of entries, however, at the cost of limited forwarding throughput and limited scalability in respect to the data plane traffic handling.

SUMMARY

In an embodiment, the present invention provides a method of forwarding packet flows in a network. The method includes originating the packet flows from a plurality of end hosts in the network; and transmitting the packet flows from a respective end host of the plurality of end hosts to a sink node via a predefined routing path that includes one or more SDN switches that are under control of an SDN controller. The one or more SDN switches include an edge switch having at least one port connected to the end host. Forwarding of a packet flow from the respective end host by the edge switch is enabled by a dedicated door-opener packet that, when being processed at the one or more SDN switches, effectuates activation or installation of a forwarding rule within the one or more SDN switches for forwarding the packet flow to a next switch along the predefined routing path.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
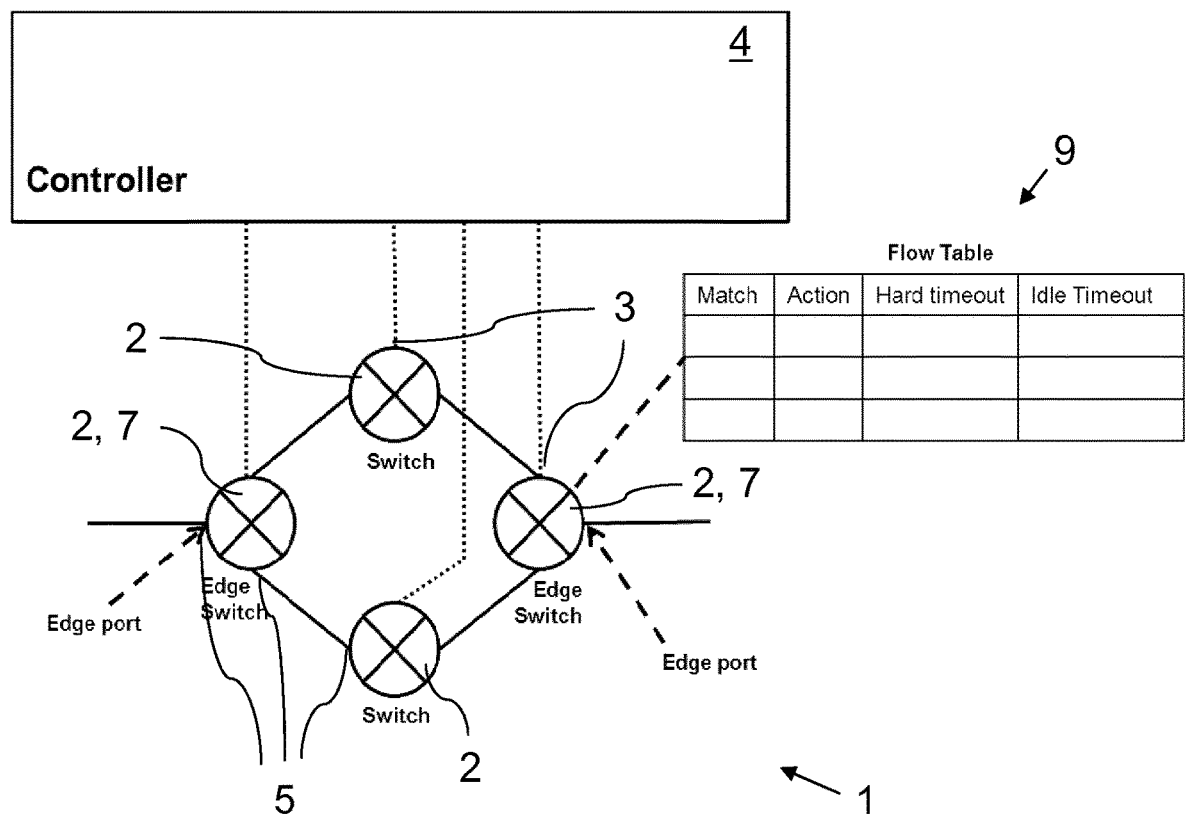
FIG. 1 is a schematic view illustrating exemplarily a general concept of a network in which embodiments of the present invention can be applied.

Embodiments of the present invention improve and further develop methods of forwarding packet flows in a network and a network system in such a way that the forwarding solution scales to a high number (e.g. in the range of millions) of end hosts transmitting data, e.g. IoT sensors, without overloading either the flow tables of the involved switches or the control plane.

Embodiments of the invention provide methods of forwarding packet flows in a network, wherein said packet flows originate from a plurality of end hosts in the network and wherein said packet flows are transmitted from the respective one of said end hosts to a sink node via predefined routing paths, wherein a routing path for packet flows of an end host includes one or more SDN switches that are under control of an SDN controller, wherein said one or more SDN switches include an edge switch having at least one port connected to said end host, and wherein the forwarding of a packet flow from a particular of said end hosts by the respective edge switch is enabled by means of a dedicated packet—door-opener packet—that, when being processed at said switches, effectuates the activation or installation of a forwarding rule within said switches for forwarding said packet flow to the next switch along its routing path.

Furthermore, embodiments of the invention provide network systems, comprising an SDN controller, a number of SDN switches that are under control of said SDN controller, a plurality of end hosts, a sink node, and predefined routing paths configured to enable transmission of packet flows originating from said end hosts to said sink node, wherein a routing path for packet flows of an end host includes one or more of said SDN switches, wherein said one or more SDN switches include an edge switch having at least one port connected to said end host, and wherein said edge switch is configured to enable forwarding of a packet flow from a particular of said end hosts by means of a dedicated packet—door-opener packet—that, when being processed at said switches, effectuates the activation or installation of a forwarding rule within said switches for forwarding said packet flow to the next switch along its routing path.

According to embodiments of the invention, flow rule installation is realized in an event-based fashion, i.e. just in time before an event (that is a packet flow transmission from an end host) is going to take place. Embodiments of the invention build on the definition of flow-based programmable network devices, for instance SDN switches, which allow stateful packet processing and which are programmable by a control entity, for instance an SDN controller, but without having to consult a controller each time. Especially, such switches can update their internal state (and thus trigger internal actions) based on an observation of network events. The idea behind embodiments of the invention is for switches to obtain knowledge about the need of an authorized end host, e.g. sensor, to start a communication flow, and to use this information to autonomously "install" or "activate" flow rules that govern forwarding behavior for this sensor to the traffic sink (e.g. the IoT server).

Instead of using reactive rule installation, which would cause control plane load, embodiments of the present invention enable just-in-time flow rule installation. Like in the reactive case, this approach allows distributing flow table entries over time (as described, for instance, in Dusi, M.; Bifulco, R.; Gringoli, F.; Schneider, F.: "Reactive logic in software-defined networking: Measuring flow-table requirements", in Wireless Communications and Mobile Computing Conference (IWCMC), 2014 International, vol., no., pp. 340-345, 4-8 Aug. 2014), but avoiding the controller interaction.

More specifically, according to embodiments of the invention dedicated packets, termed door-opener packets, are programmed into edge switches, which are ingress switches for packet flows from end hosts. Such packet, when being processed at an edge switch, effectuates the activation or installation of a forwarding rule within the edge switch for forwarding the respective packet flow to the next switch along its routing path or to its final destination. After such programming has happened once, switches can then activate (and deactivate) the relevant flow rules autonomously without controller interaction just-in-time before the actual end host data packet transmission (or a respective request from the server to poll the data from the end host). Here, "just-in-time" means that the forwarding of data from an end host is enabled for a time window of configurable duration around the actual transmission. By providing such method or system that triggers timed or just-in-time creation or installation of forwarding flow rules in switches, without interactions with the respective controller, the number of fine grained traffic forwarding rules in the switches scales, i.e. flow table scalability is achieved. Compared to the flow tables "expansions" mentioned above, the present solution is more scalable in respect to the data plane traffic handling, since it only involves the fast switches' ASIC (Application Specific Integrated Circuit). Moreover, in a scenario in which the switches' CPUs are already overloaded, the software flow table implementation cannot be used. Additionally, the security-related advantage of just-in-time rule installation would be invalidated with a software flow table approach, since in that case flow rules would be available at all times.

To summarize, embodiments of the present invention allow for triggering fine-grained forwarding rules installation in stateful SDN devices just-in-time which distributes flow entries over time, greatly increasing the scalability for a large number of devices that communicate only infrequently. This can be done without requiring interaction with the SDN controller, i.e. either autonomously by the switches or via on-path signaling.

According to an embodiment of the invention the processing of the door-opener packet at the switches may be performed only at the switches' data plane.

According to an embodiment of the invention a state table and a flow table of an edge switch may be programmed in such a way that the processing of the door-opener packet at the edge switch induces an update of the state table with a new or changed state entry for the respective packet flow. The activation of a forwarding rule for a particular packet flow, i.e. a packet flow from a particular end host in the network, is thus triggered by means of a timely induced update of the state table with a new or changed state entry for the particular packet flow. According to an embodiment state table updates may be performed by means of state transition actions contained in forwarding rules of the flow table. Specifically, the door-opener may carry information of which flow should be enabled at transmitting packets. A flow table's entry, when matching the door opener, may then set a state table's entry accordingly, thereby configuring a state entry for the flow contained in the door-opener.

According to an embodiment this new or changed state entry may be configured with a timeout that triggers its deletion after a certain time since its installation. In this way it is possible to open a possible "transmission window" for an end host only for a small time band (of configurable length, depending on the implemented timeout value) around the actual time of packet flow transmission. This significantly improves the security of the network, since it becomes difficult for potential attackers to intercept or manipulate any end host's data, e.g. sensor data. As an alternative to using timeouts, flow rules may be de-installed automatically by exploiting the fact that in many application scenarios (e.g. smart grids) only a given (and known) number of consecutive packets (in most cases, likely only one) will be sent by an individual sensor, in which case the rule can be removed after the last packet has been forwarded.

According to an embodiment the controller may trigger the provision of a door-opener packet to a switch by sending the door-opener packet as a control plane message to said switch. Alternatively, if supported by the respective switch, the controller may trigger the provision of a door-opener packet to a switch by programming a time-triggered packet generation in the switch itself. To this end, as a prerequisite for both cases, the controller may obtain knowledge about the need of enabling the communication for a particular end host. This could be achieved via static and/or manual configuration once a new end host gets connected to the network system, via querying an API (Application Programming Interface) that end host may have for this purpose, or via machine learning approaches. In any case, the controller will use this knowledge to program the generation of a door-opener packet.

According to an embodiment the forwarding of data from an end host to the sink node may also be realized on demand, i.e. instead of enabling data transmissions at fixed points in time only. In this case, it may be provided that the edge switch asks the SDN controller on demand for the provision of a door-opener packet.

According to an embodiment the door-opener packets may be routed to the sink node via the same routing path as the respective packet flow to which they are associated. In this way, all further switches on the routing path of a packet flow from a particular end host will automatically, i.e. without any controller interactions, install the required forwarding rules, just in time before the actual packet flow of the end host arrives at the respective switches. The routing of the door-opener packet along the same routing path as the respective packet flow may be achieved by performing routing based on the packet flow's IP destination address, which may be incorporated into the header of the door-opener packet.

According to an embodiment door-opener packets may be constructed in such a way that their header contains a tag that identifies these packets as dedicated door-opener packets. By using such tags, the edge switch as well as downstream switches will be informed about the need to install or activate an appropriate state table entry.

The door-openers are generated per packet flow specific, i.e. each packet flow has its own door-opener packet. According to an embodiment an identification of the respective packet flow to which a particular door-opener packet is associated may be introduced into the header of the respective door-opener packet. These flow identification data enables the switches to configure an appropriate state entry exactly for the packet flow contained in the door-opener.

According to an embodiment it may be provided that the network system guarantees that door-openers can be generated only by trusted sources. This may be realized by a configuration according to which the edge switch drops any door-opener packet that is received via an edge port of the edge switch, i.e. from a port that is connected to devices that are not part of the controlled network.

According to embodiments of the invention, in order to enable the controller entity to obtain knowledge about the time and interval of packet generation per each end host, these end hosts may comprise an API (Application Programming Interface) from which the controller can query the required information. In accordance with a main application scenario of the present invention the end hosts may include sensors and/or smart meters, e.g. of a smart grid. Generally, obtaining knowledge about time and interval of packet transmissions of these hosts could be achieved via static or manual configuration once a new host/sensor gets connected, or via machine learning approaches.

Embodiments of the present invention, as described hereinafter in detail, assume a network system 1 including a number of flow-based programmable network devices (e.g. SDN switches 2) that expose a control interface 3 that can be used to configure or program them. Without loss of generality it is assumed for simplicity that the devices are controlled by a logically centralized controller entity (e.g. SDN controller 4). However, as will be appreciated by those skilled in the art, the present invention would be applicable also in the case of flow-based programmable network devices being controlled by different controllers, provided that these controllers are able to exchange messages among themselves. The controller 4 is connected to each of the devices (from here on interchangeably termed flow-based programmable network devices or briefly switches or SDN switches 2) of the network system 1 using a control channel. A switch 2 has a set of ports 5 (input ports 5a and output ports 5b) that can be connected to other switches 2 or to end hosts 6, as exemplarily illustrated in FIG. 1, which illustrates a general concept of a network system 1 in which embodiments of the present invention can be applied. A port 5 connected to an end host 6 is called "edge port". A switch 2 that has one or more edge ports is called "edge switch" 7.

A switch 2 further contains a flow table (FT) 10, as also shown in FIG. 1. The flow table 10 contains flow table entries (FTE). A FTE is composed of: a match part, which identifies network packets to which the FTE is applied by specifying the values of the packet's header fields; an action part, which specifies the action to be applied to the matched packets; an idle timeout that specifies the time after which the FTE has to be deleted if it did not match any packet. The set of FTEs in a switch's 2 FT 10 defines how the switch 2 forwards network packets. FTE's action can include the sending of packets to the controller 4 through the control channel. The transfer of a network packet from the switch 2 to the controller 4 is called "packet_in" in the context of the present invention. The packet_in contains the following information: the network packet that generated it, the switch identifier from which it is sent and the identifier of switch's 2 input port 5a on which the packet was received. The switch 2 can be configured to notify the controller 4 whenever a FTE gets deleted.

Figure 2:
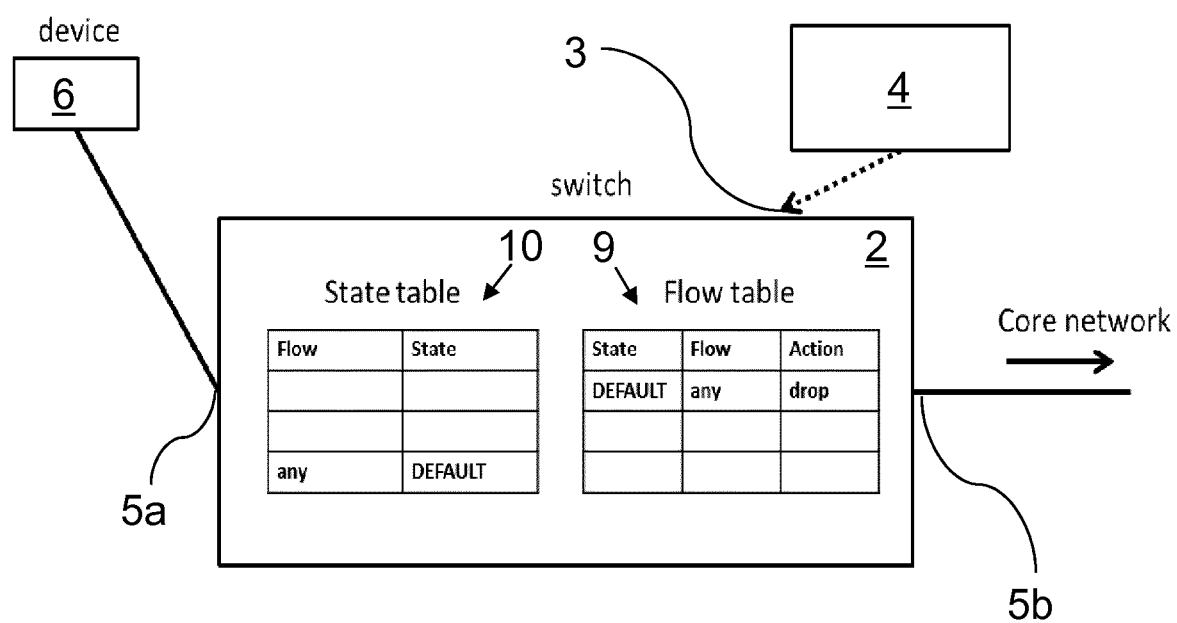
FIG. 2 is a schematic view illustrating a network switch that contains a state table and a flow table in accordance with an embodiment of the present invention.

Additionally, switches 2 may have a state table 9, as illustrated in FIG. 2. A state table entry specifies the state for a given network flow. When a packet, e.g. generated by an end host 6 in the network (for instance a sensor or a smart meter) enters a switch 2, if it is matched by one of the entries in the state table 9, it is enriched by metadata that carries such state information within the switch 2. The FTEs may also match on this state information. Furthermore, a FTE's action may also include a set state action for a given flow. Such set state action modifies the state information contained in the state table 9, for a given state table's entry. Thus, the flow table 8 can be used for the implementation of state transitions for a given flow, upon reception of a network packet. Both the state table entries and FTEs are associated with both idle and hard timeouts. Further details with respect to additional or similar characteristics/capabilities of this kind of switch can be obtained from Giuseppe Bianchi et al.: "OpenState: Programming Platform-independent Stateful OpenFlow Applications inside the Switch", *SIGCOW Comput. Commun. Rev.* 44, 2 (April 2014), 44-51.

In connection with the following description of embodiments of the present invention a SDN network will be assumed, e.g., one based on the OpenFlow technology, as the network system to which the described embodiments apply. In fact, a SDN network provides all the aforementioned properties. However, as will be appreciated by those skilled in the art the present invention is applicable to any other network that provides such properties. Furthermore, the terms flow rule, forwarding rule and FTE will be sometimes used interchangeably hereinafter.

Figure 3:
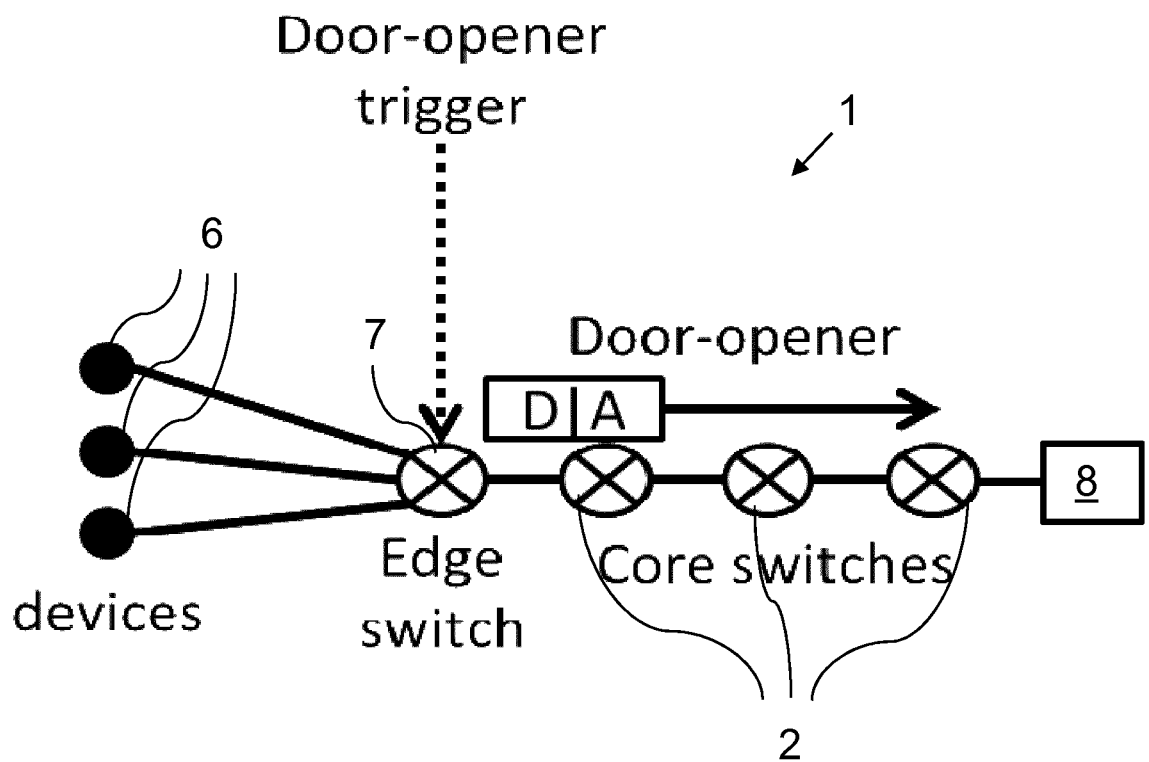
FIG. 3 is a schematic view illustrating a door-opener solution in accordance with an embodiment of the present invention.

Turning now to FIG. 3, this figure illustrates an embodiment of the present invention according to which event-based flow rule installation is performed by using a dedicated packet, hereinafter denoted 'door-opener packet'. Generally, this embodiment relates to a system that triggers the installation of forwarding rules in network switches using a data plane packet that carries flow identification data and that traverses the flow's path before the actual flow's packets are forwarded.

Specifically, FIG. 3 depicts a segment of a network system 1 with a number of SDN switches 2 that are under control of a SDN controller (not shown). One of the switches 2 (the left one in FIG. 3) functions as edge switch 7 being connected to a plurality of end hosts 6. These end hosts 6 may be devices, e.g. sensors, which from time to time transmit (small amount of) data to a sink node 8, e.g. an IoT server, via predefined routing paths. In the context of the subsequent description of the illustrated embodiment it is assumed that a routing path from the end hosts 6 to the sink node 8 includes the edge switch 7 (as ingress switch for the transmitted data) as well as the three further switches 2 (denoted core switches in FIG. 3).

In the illustrated embodiment the controller 4 is assumed to possess knowledge about the need of enabling the communication for an end host 6. For instance, the controller 4 knows that a particular end host 6 will transmit data at regular intervals, for instance, every day at 9:00 am or at the first day of each month at 12:00. In any case, the controller 4 will use this knowledge to program the generation of a door-opener packet, as will be described in detail hereinafter.

Figure 4:
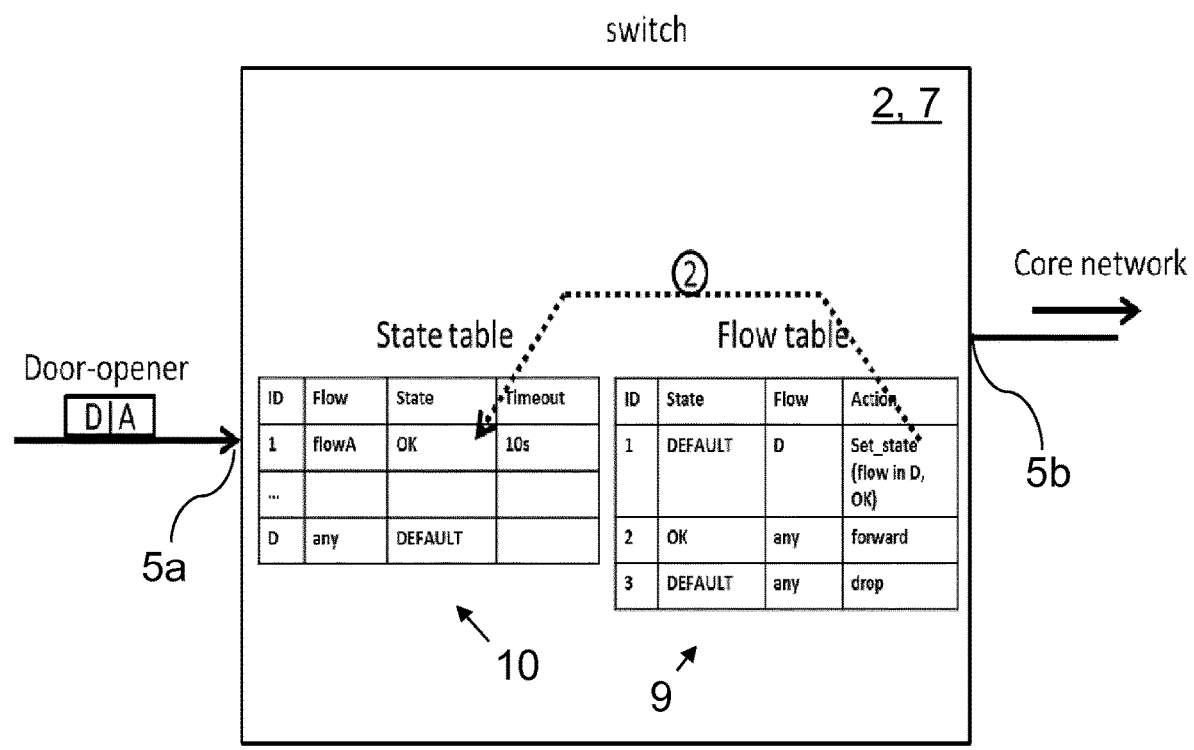
FIG. 4 is a schematic view illustrating a stateful SDN network switch with a door-opener implementation in accordance with an embodiment of the present invention.

The door-opener packet creation is triggered at the first switch on a given network flow's path, i.e. at the edge switch 7 in the embodiment of FIG. 3. The creation of the door-opener may happen in different ways. For instance, the controller 4 may trigger its generation by sending a control plane message to the edge switch 7, as illustrated in FIG. 4. Alternatively, the controller 4 may program a time-triggered packet generation in the edge switch 7 itself, provided that the edge switch 7 supports such a feature.

What happens, when the door-opener packet is received at an input port 5a of edge switch 7, which is a stateful SDN switch, is illustrated in FIG. 4. The header of the door-opener packet contains a piece of information that identifies the packet as a dedicated door-opener packet. Furthermore, it is important to note that the door-opener packet is flow specific, i.e. each flow has its own door-opener packet. This may be achieved by the door-opener packet containing information that identifies the end host 6 whose incoming traffic has triggered the door-opener. In the embodiment illustrated in FIG. 4 the door-opener packet is associated with a particular flow, denoted 'flow A'.

In the illustrated embodiment the triggering of an event (i.e., because a deadline for the transmission of the data from an end host 6, e.g. a sensor, has passed) is implemented by means of FTEs. Initially, i.e. during time periods in which no data transmissions from the end host are scheduled to take place, the state table 10 of edge switch 7 contains an entry (with ID 1) that assigns flow A the state 'DEFAULT'. Consequently, when a flow A is subsequently processed by the edge switch's 7 flow table 9, this flow matches the FTE with ID 3, i.e. flow A will be dropped. Now, when the door-opener packet (hereinafter denoted 'D') arrives at the edge switch 7, it matches the entry of the state table 10 with ID D and, thus, gets assigned the state 'DEFAULT'. Consequently, when door-opener packet D is processed by the edge switch's 7 flow table 9, this packet matches the FTE with ID 1.

This FTE with ID 1 is configured with a set_action state that sets the state for a subset of the entries in the state table 10 (e.g., those entries related to the end hosts 6 whose communication has to be enabled). Specifically, according to the illustrated embodiment, the door opener packet D (which is provided to the switch 2 in order to enable a flow rule at the switch 2 that relates to the specific flow A from a specific one of the end hosts 6), due to matching FTE ID1 of the switch's 2 flow table 9, effectuates the set of a state entry 'OK' for the flow specified in the door-opener packet, i.e. flow A, i.e. it causes a state transition for flow A to state 'OK', as shown in FIG. 4. Consequently, flow A, when arriving at the switch 2, matches FTE ID2 of state table 9 and will thus be forwarded. The state entry will disappear after a 10 s timeout will expire. In other words, after a timeout of 10 s the state entry is deleted and the 'forwarding window' is closed, which means that any data transmitted from this end host 6 will not be forwarded anymore.

The ingress, i.e. edge switch 7, generates a door-opener for a given end host 6 as described above, e.g., in response to a controller-generated triggering message or because of a time-triggered packet generation. Then, it will generate a door-opener packet and send it to the same out-port 5b, which will also be used by the packet flow transmitted by the end host 6, i.e., to the next downstream switch 2 on the flow's path up to the sink node 8. In each switch 2 along the flow's path the door-opener triggers the installation of a flow specific forwarding rule, in the same way as described above for the edge switch 7. The actual end host's 6 data packets will only be forwarded after the door-opener has been delivered. Consequently, just-in-time flow rule installation is realized along the entire flow path.

According to a specific embodiment the door-opener packet will contain information identifying the end host 6 (e.g., sensor) whose incoming traffic has triggered the door opener. The downstream switch 2, upon receiving the door-opener packet, extracts the end host's 6 ID and creates a new state table entry for such flow. The advantage of this approach is that only ingress switches 7 need to be involved in the door-opener generation, while all the other switches 2 in the network 1 are automatically configured for the forwarding of a packet when the door opener is received. In fact, all further switches 2 on the path install the required rules on demand right before the device data arrives. All of this happens without controller 4 interactions.

It is once again noted that door opener packets are generated by the edge switches 7, and that door-openers are per flow specific, that is each flow has its own door opener packet. Because of this, according to an embodiment of a door-opener implementation it may be provided to just tag an end host's 6 packet to inform the downstream switches 2 about the need to install a new entry in the state table 10.

Besides scalability and low-overhead advantages, the embodiments described above have security-related advantages as well. First, by having flow rules "alive" only for a very small time band around the actual data transmission, it becomes difficult for attackers in the network to hack into end hosts 6 or get their hands on the host's data. Outside of the time band packets destined for the end host 6 cannot be forwarded, the end host 6 is basically invisible. Second, the event-triggered installation of flow rules basically limits traffic generation and forwarding opportunities for attached end hosts 6. In a context such as Smart Cities, there will be many end hosts 6 (in the form of sensors) from very heterogeneous sources. Still, end hosts 6 which are expected (according to data sheet or whatever source of information) to produce data only once per time period, will not succeed at pushing data through the network more often than that, because the ingress switch 7 will not have corresponding flow rules outside of the pre-configured time band.

It should be noted that on-demand access (instead of access at fixed-interval) of end host 6 data from the sink node 8 (e.g. an IoT server) is also possible with the present approach. In that case, however, the ingress switch 7 needs to use the reactive mode to ask the controller 4 for a corresponding door-opener. The controller 4 would then send back a message that will be interpreted by the ingress switch 7 such as to lookup and install the pre-configured flow rule for the respective end host 6 and to potentially send the door opener to the next downstream switch 2 along the respective flow's forwarding path. While in this case, one controller roundtrip is needed for the ingress switch 7, all other switches 2 on the forwarding path can again activate and install the required flow rules on demand.

Finally, it is noted that a network that uses door-openers in the sense of the present invention should ensure that any door-opener packet generated outside of the network perimeter is dropped. In effect, this corresponds to install a dropping rule to all the ingress switches 7 of the network 1, which drops any matched door-opener packet coming from the switch's 7 edge ports, i.e. those that are connected to devices that are not part of the controlled network 1.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMBERS

1 network system
2 SDN switch
3 control interface
4 SDN controller
5 port
6 end host
7 edge switch
8 sink node
9 flow table
10 state table
11 data transmitting device/sensor

The invention claimed is:

1. A method of forwarding packet flows in a network, the method comprising:
   originating the packet flows from a plurality of end hosts in the network; and
   transmitting the packet flows from a respective end host of the plurality of end hosts to a sink node via a predefined routing path that includes one or more SDN switches that are under control of an SDN controller,
   wherein the one or more SDN switches include an edge switch having at least one port connected to the end host, and
   wherein forwarding of a packet flow from the respective end host by the edge switch is enabled by a dedicated door-opener packet that, when being processed at the one or more SDN switches, effectuates activation or installation of a forwarding rule within the one or more SDN switches for forwarding the packet flow to a next switch along the predefined routing path,
   wherein the processing of the door-opener packet at the one or more SDN switches is performed only at a data plane of the one or more SDN switches.

2. The method according to claim 1, wherein a state table and a flow table of a respective switch are programmed in such a way that the processing of the door-opener packet at the respective switch induces an update of the state table with a new or changed state entry for a respective packet flow.

3. The method according to claim 2, wherein the new or changed state entry is configured with a timeout that triggers deletion of the new or changed state entry after a certain time since its installation.

4. The method according to claim 1, wherein the SDN controller triggers provision of a door-opener packet to a respective switch by sending the door-opener packet as a control plane message to the respective switch.

5. The method according to claim 1, wherein the SDN controller triggers provision of a door-opener packet to a respective switch by programming a time-triggered packet generation in the respective switch.

6. The method according to claim 1, wherein an edge switch asks the SDN controller on demand for provision of a door-opener packet.

7. The method according to claim 1, wherein the door-opener packet is routed to the sink node via a same routing path as a respective packet flow to which it is associated.

8. The method according to claim 1, wherein a header of the door-opener packet contains a tag that identifies the door-opener packet as a dedicated door-opener packet, and/or wherein a header of the door-opener packet contains an identification of a respective packet flow to which it is associated.

9. The method according to claim 1, wherein an edge switch drops any door-opener packet that is received via an edge port of the edge switch.

10. A flow-based programmable network device, configured for being employed in a method according to claim 1.

11. A controller entity configured for being employed in a method according to claim 1.

12. The method according to claim 1, wherein the processing of the door-opener packet at the one or more designated switches, which effectuates the activation or installation of the forwarding rule, is performed without interactions with the SDN controller.

13. A network system, the network system comprising:
an SDN controller;
a plurality of SDN switches that are under control of the SDN controller;
a plurality of end hosts;
a sink node; and
predefined routing paths configured to enable transmission of packet flows originating from the plurality of end hosts to the sink node,
wherein a routing path for packet flows of a respective end host includes one or more designated SDN switches of the plurality of SDN switches, wherein the one or more designated SDN switches include an edge switch having at least one port connected to the end host, and
wherein the one or more designated SDN switches are configured to enable forwarding of a packet flow from the respective end host via a dedicated door-opener packet that, when being processed at the one or more designated SDN switches, effectuates activation or installation of a forwarding rule within the one or more designated SDN switches for forwarding the packet flow to a next switch along the routing path,
wherein the processing of the door-opener packet at the one or more designated SDN switches is performed only at a data plane of the one or more designated SDN switches.

14. The system according to claim 13, wherein the end hosts comprise an API from which the SDN controller can query times and intervals of the packet flow transmissions of the end host.

15. The system according to claim 13, wherein the end hosts include sensors and/or smart meters of a smart grid.

16. The system according to claim 13, wherein the processing of the door-opener packet at the one or more designated switches, which effectuates the activation or installation of the forwarding rule, is performed without interactions with the SDN controller.

17. A method of forwarding, in a software-defined network (SDN) having an SDN controller, a packet flow along a predefined routing path from an edge switch to a sink node, the predefined routing path including a number of additional switches, the method comprising:
transmitting, in a data plane, a door-opener packet along the predefined routing path from the edge switch to the sink node such that each of the additional switches receives the door-opener packet and forwards it to a next node along the routing path;
installing, by each respective additional switch in response to receiving and processing the door-opener packet and without interaction with the SDN controller, a respective forwarding rule for forwarding the packet flow to a respective next node along the routing path;
receiving, by the edge switch, the packet flow; and
transmitting, in the data plane, the packet flow along the predefined routing path from the edge switch to the sink node,
wherein the edge switch has at least one port connected to the end host, and
wherein the door-opener packet includes information configured to trigger the installing of each respective forwarding rule by modifying an entry of a respective state table maintained at each respective additional switch such that each respective additional switch will forward packets belonging to the packet flow.

18. The method of claim 17, wherein transmitting the packet flow along the predefined routing path from the edge switch to the sink node is performed by forwarding, by each respective additional switch according to each respective installed forwarding rule, the packet flow.

19. The method of claim 17, wherein the SDN controller is configured to trigger the transmitting of the door-opener packet by sending the door-opener packet as a control plane message to the edge switch.

20. The method of claim 17, wherein the SDN controller is configured to trigger the transmitting of the door-opener packet by programming a time-triggered door-opener packet generation rule in the edge switch.

* * * * *